United States Patent
Brutto et al.

(10) Patent No.: US 9,676,957 B2
(45) Date of Patent: Jun. 13, 2017

(54) NITROFUNCTIONAL ACRYLATE COPOLYMERS FOR BINDER COMPOSITIONS

(71) Applicant: ANGUS Chemical Company, Buffalo Grove, IL (US)

(72) Inventors: Patrick E. Brutto, Bloomingdale, IL (US); George D. Green, Cary, IL (US); Zhenwen Fu, North Wales, PA (US); Eric C. Greyson, Blue Bell, PA (US); Andrew Hejl, Lansdale, PA (US); Jia Tang, Phoenixville, PA (US)

(73) Assignee: ANGUS CHEMICAL COMPANY, Buffalo Grove, IL (US)

( * ) Notice: Subject to any disclaimer, the term of this patent is extended or adjusted under 35 U.S.C. 154(b) by 65 days.

(21) Appl. No.: 14/651,494

(22) PCT Filed: Nov. 13, 2013

(86) PCT No.: PCT/US2013/069802
§ 371 (c)(1),
(2) Date: Jun. 11, 2015

(87) PCT Pub. No.: WO2014/092914
PCT Pub. Date: Jun. 19, 2014

(65) Prior Publication Data
US 2015/0322281 A1 Nov. 12, 2015

Related U.S. Application Data

(60) Provisional application No. 61/736,746, filed on Dec. 13, 2012.

(51) Int. Cl.
| | | |
|---|---|---|
| C09D 133/04 | (2006.01) | |
| C09D 133/14 | (2006.01) | |
| C09D 133/24 | (2006.01) | |
| C09D 133/26 | (2006.01) | |
| C09D 133/12 | (2006.01) | |
| C08F 226/02 | (2006.01) | |

(52) U.S. Cl.
CPC .......... C09D 133/12 (2013.01); C08F 226/02 (2013.01)

(58) Field of Classification Search
CPC .... C08F 222/36; C08F 222/38; C08F 226/02; C09D 133/08; C09D 133/10; C09D 133/12; C09D 133/24; C09D 133/26
See application file for complete search history.

(56) References Cited

U.S. PATENT DOCUMENTS

| | | | | |
|---|---|---|---|---|
| 3,770,806 A * | 11/1973 | Rocklin | ................. | C08G 5/226 149/19.3 |
| 8,039,188 B2 * | 10/2011 | Fukushima | .......... | G03G 9/0819 430/105 |
| 2009/0075060 A1 * | 3/2009 | Miller | .................... | A61L 9/014 428/323 |
| 2010/0008961 A1 * | 1/2010 | Takeko | ................. | A01N 25/28 424/408 |

OTHER PUBLICATIONS

Biggs et al; Journal of Applied Polymer Science; 1972; 16(7), 1779-89.*
Takahashi et al; Journal of Applied Polymer Science 1968, 12(7), 1683-95.*
Communication issued on EP Appl. 13/799154.3, mailed Apr. 15, 2016.
Database Registry (online) Chemical Abstracts Service, Columbus, OH, Nov. 16, 1984, CN-2-Propenoic acid, 3-hydroxy-2-(hydroxymethyl)-2-nitropropyl ester, 2 pages.
Search Report issued on European Application 16186410.3, mailed Nov. 3, 2016.
Database Registry (online) Chemical Abstracts Service, Columbus, Ohio, Nov. 16, 1984, "CN-2-Propenoic acid, 3-hydroxy-2-(hydroxymethyl)-2-nitropropyl ester".
International Search Report and Written Opinion on PCT/US2013/069802, mailed Apr. 14, 2014.
Takahashi et a., "The polymerization and copolymerization of nitroalkyl acrylates and nitoalkyl methacrylates", Journal of Applied Polymer Science, vol. 12, No. 7, 1968, pp. 1683-1695.
Tanaka et al., "Polymerization of nitroalkyl acrylates", Journal of Applied Polymer Science, vol. 8, No. 4, 1964, pp. 1787-1799.

* cited by examiner

*Primary Examiner* — Karuna P Reddy
(74) *Attorney, Agent, or Firm* — Foley & Lardner LLP; Melissa El Menaouar; Joseph P. Meara

(57) ABSTRACT

Provided is a binder composition and its use in aqueous based paints and coatings and other applications. The binder composition comprises: (a) a copolymer formed from one or more esters or amides of acrylic acid or methacrylic acid, or their mixtures, together with a monomer unit of formula I, wherein R, R1 R2, R3, R4, and X are as defined above; and (b) water, wherein the binder composition is an aqueous emulsion.

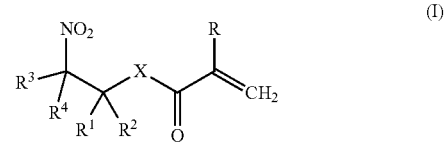

(I)

21 Claims, No Drawings

NITROFUNCTIONAL ACRYLATE COPOLYMERS FOR BINDER COMPOSITIONS

CROSS-REFERENCE TO RELATED APPLICATIONS

This applications is a 371 National Phase Application of PCT/US2013/069802, filed Nov. 13, 2013, which claims priority from U.S. provisional application Ser. No. 61/736,746, filed Dec. 13, 2012, which are incorporated herein by reference in their entireties.

FIELD

This invention relates generally to binder compositions and their use in aqueous based paints and coatings and other applications. More specifically, the invention relates to nitrofunctional acrylate polymers for such use.

BACKGROUND

Paint and coating formulations are ubiquitous in today's societies. They are used on a wide variety of surfaces, for instance, metal, wood, plastics, brick, wallboard, etc., and for many functions, such as surface protection from chemical and/or physical hazards, for decoration, waterproofing, and the like.

Paints and coatings are typically composed of a binder material, a carrier or solvent, together with various other additives. The other additives may include, for instance, neutralizers, antimicrobials, pigments, uv absorbers, etc. The binders provide a network in which the other additives are dispersed and suspended. Binders also function as the primary film forming component of the finished coating, provide integrity and adhesion for the coated film and overall protect the substrate from the external environment. Generally, there are two classes of binders: latex binders, which are used in aqueous based formulations, and alkyd-based binders, which are used in non-aqueous formulations, ultimately resulting in latex paints and coatings and alkyd paints and coatings, respectively.

Aqueous based paints and coatings use water as the main carrier instead of an organic solvent. As a result, they are generally lower volatile organic content (VOC) materials and are therefore favored in some applications and regions where low VOC is desired or required. Aqueous based paints and coatings, however, may not provide the equivalent properties to their alkyd based counterparts. For instance, they may not provide equivalent protection against chemical or physical hazards, or as good adhesion to the substrate. Consequently, a continuing need exists to discover ways for improving the properties of aqueous based paints and coatings.

The problem addressed by this invention is the provision of binder compositions for use, for example, in aqueous based paints and coatings that provide improved properties over previous systems including, for instance, improved hardness and/or chemical resistance.

STATEMENT OF INVENTION

We have now found that the functionalization of acrylate polymers with nitro groups improves various properties of the polymer. Advantageously, when the nitrofunctional polyacrylate is used as a binder in an aqueous based paint or coating or other formulations, the formulation may exhibit better hardness, chemical resistance, or both. The formulation may also result in improved gloss.

In one aspect, there is provided a binder composition comprising:

(a) a copolymer formed from one or more esters or amides of acrylic acid or methacrylic acid, or their mixtures, together with a monomer unit of formula I:

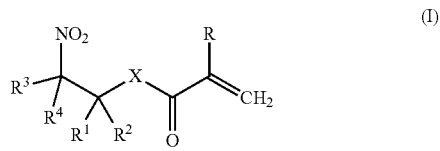

(I)

wherein R is H or $CH_3$;

$R^1$ and $R^2$ are independently H, linear or branched $C_1$-$C_8$ alkyl optionally substituted with $NO_2$, or $R^1$ and $R^2$ together with the carbon atom to which they are attached form $C_3$-$C_{12}$ cycloalkyl;

$R^3$ and $R^4$ are independently H, linear or branched $C_1$-$C_8$ alkyl, or a group of formula $C(R^1)(R^2)$—O—$R^5$, wherein $R^5$ is H or C(=O)—C(R)=$CH_2$, or $R^3$ and $R^4$, together with the carbon atom to which they are attached, form $C_3$-$C_{12}$ cycloalkyl;

X is O or $NR^6$, wherein $R^6$ is H, linear or branched $C_1$-$C_8$ alkyl optionally substituted with $NO_2$, or $R^6$ is C(=O)—C(R)=$CH_2$; and (b) water, wherein the binder composition is an aqueous emulsion.

In another aspect, there is provided an aqueous based paint or coating comprising a carrier and a binder, wherein the binder is a composition as described herein.

DETAILED DESCRIPTION

Unless otherwise indicated, numeric ranges, for instance as in "from 2 to 10," are inclusive of the numbers defining the range (e.g., 2 and 10).

Unless otherwise indicated, ratios, percentages, parts, and the like are by weight. "Alkyl," as used in this specification, encompasses straight and branched chain aliphatic groups having the indicated number of carbon atoms. Preferred alkyl groups include, without limitation, methyl, ethyl, propyl, isopropyl, butyl, isobutyl, sec-butyl, tert-butyl, pentyl, and hexyl.

The term "cycloalkyl" refers to saturated and partially unsaturated cyclic hydrocarbon groups having the indicated number of ring carbon atoms. Preferably, cycloalkyl contains 3 to 8 carbons, and more preferably 3 to 7 carbons. Preferred cycloalkyl groups include, without limitation, cyclopropyl, cyclobutyl, cyclopentyl, cyclopentenyl, cyclohexyl, cyclohexenyl, cycloheptyl, and cyclooctyl. The cycloalkyl group may be optionally substituted with linear or branched $C_1$-$C_8$ alkyl.

As noted above, in one aspect the invention provides a binder composition. The composition is in the form of an aqueous emulsion and contains water and a copolymer formed from one or more esters or amides of acrylic acid or methacrylic acid, or their mixtures, together with a monomer unit of formula I:

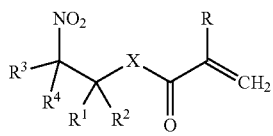

(I)

wherein R, $R^1$ $R^2$, $R^3$, $R^4$, and X are as defined above.

In some embodiments, $R^1$ in the monomer unit of formula I is H and $R^2$ is H or linear or branched $C_1$-$C_8$ alkyl optionally substituted with $NO_2$. Preferred alkyl in this embodiment include linear or branched $C_1$-$C_6$ alkyl, alternatively $C_1$-$C_4$ alkyl, optionally substituted with $NO_2$. In some embodiments, both $R^1$ and $R^2$ are H.

In some embodiments, $R^1$ and $R^2$ are independently linear or branched $C_1$-$C_8$ alkyl optionally substituted with $NO_2$, or $R^1$ and $R^2$ together with the carbon atom to which they are attached form $C_3$-$C_{12}$ cycloalkyl. Preferred alkyl in this embodiment include linear or branched $C_1$-$C_6$ alkyl, alternatively $C_1$-$C_4$ alkyl, optionally substituted with $NO_2$. Preferred cycloalkyl include $C_3$-$C_{12}$ cycloalkyl, more preferably cyclopentyl, cyclohexyl, cycloheptyl, or cyclooctyl. Cyclohexyl is preferred.

In some embodiments, $R^3$ is H and $R^4$ is H, linear or branched $C_1$-$C_8$ alkyl, or a group of formula $C(R^1)(R^2)$—O—$R^5$. Preferred alkyl in this embodiment include linear or branched $C_1$-$C_6$ alkyl, alternatively $C_1$-$C_4$ alkyl, alternatively methyl or ethyl. Preferably, $R^1$ and $R^2$ and are both H in this embodiment.

In some embodiments, $R^3$ and $R^4$ are independently linear or branched $C_1$-$C_8$ alkyl, or $R^3$ and $R^4$, together with the carbon atom to which they are attached, form $C_3$-$C_{12}$ cycloalkyl. Preferred alkyl in this embodiment include linear or branched $C_1$-$C_6$ alkyl, alternatively $C_1$-$C_4$ alkyl, or more specifically methyl, ethyl, or propyl. Preferred cycloalkyl include $C_3$-$C_{12}$ cycloalkyl, more preferably cyclopentyl, cyclohexyl, cycloheptyl, or cyclooctyl. Cyclohexyl is preferred.

In some embodiments, $R^3$ and $R^4$ are independently a group of formula $C(R^1)(R^2)$—O—$R^5$. In this embodiment, it may be preferred for one or both of the $R^5$ groups to be H. It may also be preferred for both $R^5$ groups to be $C(=O)$—$C(R)=CH_2$ (where R is H or $CH_3$).

In some embodiments, R in the monomer unit of formula I is H. In some embodiments, R is $CH_3$.

In some embodiments, X is O.

In some embodiments, X is $NR^6$.

In some embodiments, $R^6$ is H.

In some embodiments, $R^6$ is linear or branched $C_1$-$C_8$ alkyl, alternatively $C_1$-$C_6$ alkyl, or alternatively $C_1$-$C_4$ alkyl, optionally substituted with $NO_2$. Preferred alkyl for this embodiment include isopropyl.

In some embodiments, $R^6$ is $C(=O)$—$C(R)=CH_2$ (where R is H or $CH_3$).

In some embodiments, the monomer unit of formula I is as shown in Table 1.

TABLE 1

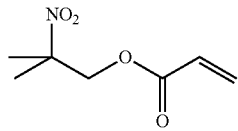

2-nitro-2-methylpropyl acrylate

TABLE 1-continued

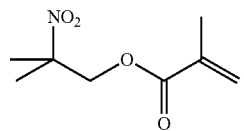

2-nitro-2-methylpropyl methacrylate

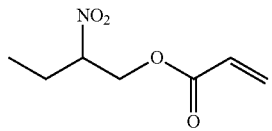

2-nitrobutyl acrylate

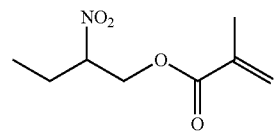

2-nitrobutyl methacrylate

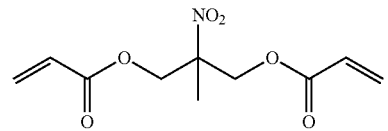 [SMILES: C=CC(=O)OCC(C)(COC(=O)C=C)[N+](=O)[O-]]

2-methyl-2-nitropropane-1,3-diyl diacrylate

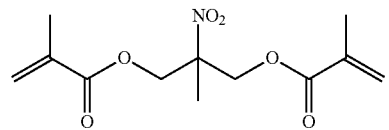 [SMILES: C=C(C)C(=O)OCC(C)(COC(=O)C(=C)C)[N+](=O)[O-]]

2-methyl-2-nitropropane-1,3-diyl bis(2-methylacrylate)

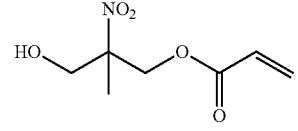

3-hydroxy-2-methyl-2-nitropropyl acrylate

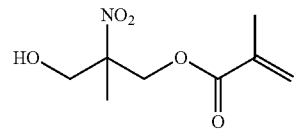

3-hydroxy-2-methyl-2-nitropropyl methacrylate

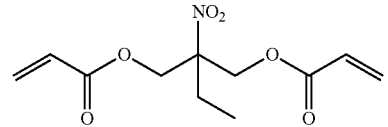 [SMILES: C=CC(=O)OCC(CC)(COC(=O)C=C)[N+](=O)[O-]]

2-ethyl-2-nitropropane-1,3-diyl diacrylate

TABLE 1-continued

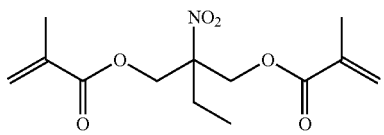 [SMILES: C=C(C)C(=O)OCC(CC)(COC(=O)C(=C)C)[N+](=O)[O-]]

2-ethyl-2-nitropropane-1,3-diyl bis(2-methylacrylate)

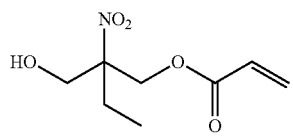

2-(hydroxymethyl)-2-nitrobutyl acrylate

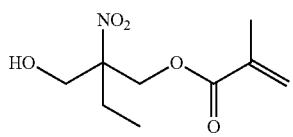

2-(hydroxymethyl)-2-nitrobutyl methacrylate

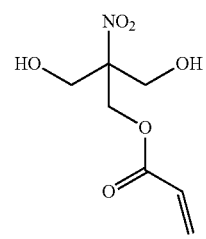

3-hydroxy-2-(hydroxymethyl)-2-nitropropyl acrylate

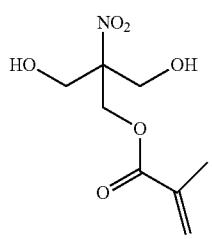

3-hydroxy-2-(hydroxymethyl)-2-nitropropyl methacrylate

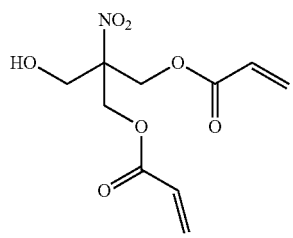 [SMILES: C=CC(=O)OCC(CO)(COC(=O)C=C)[N+](=O)[O-]]

2-(hydroxymethyl)-2-nitropropane-1,3-diyl diacrylate

TABLE 1-continued

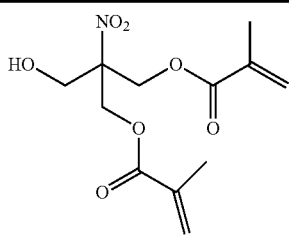

2-(hydroxymethyl)-2-nitropropane-1,3-diyl bis(2-methylacrylate)

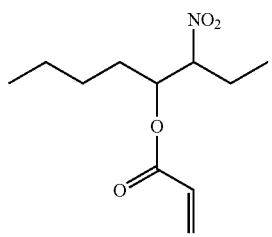 [SMILES: C=CC(=O)OC(CCCC)C(CC)[N+](=O)[O-]]

3-nitrooctan-4-yl acrylate

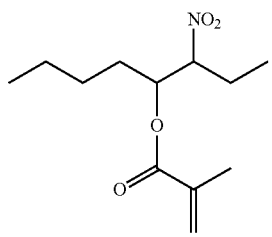 [SMILES: C=C(C)C(=O)OC(CCCC)C(CC)[N+](=O)[O-]]

3-nitrooctan-4-yl methacrylate

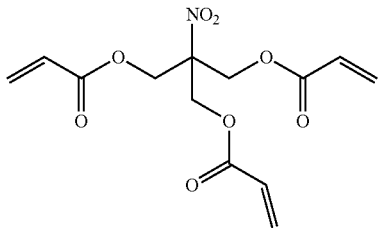 [SMILES: C=CC(=O)OCC(COC(=O)C=C)(COC(=O)C=C)[N+](=O)[O-]]

2-((acryloyloxy)methyl)-2-nitropropane-1,3-diyl diacrylate

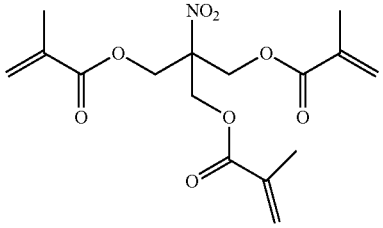 [SMILES: C=C(C)C(=O)OCC(COC(=O)C(=C)C)(COC(=O)C(=C)C)[N+](=O)[O-]]

2-((methacryloyloxy)methyl)-2-nitropropane-1,3-diyl bis(2-methylacrylate)

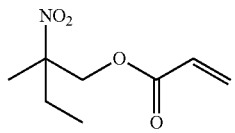

2-methyl-2-nitrobutyl acrylate

TABLE 1-continued

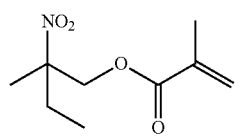

2-methyl-2-nitrobutyl methacrylate

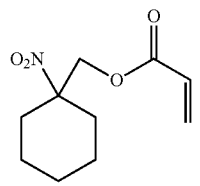

(1-nitrocyclohexyl)methylacrylate

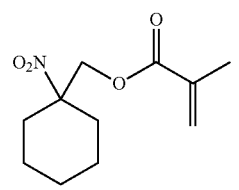 [SMILES: C=C(C)C(=O)OCC1([N+](=O)[O-])CCCCC1]

(1-nitrocyclohexyl)methyl methacrylate

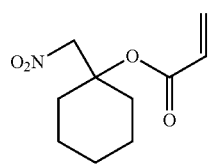

1-(nitromethyl)cyclohexyl acrylate

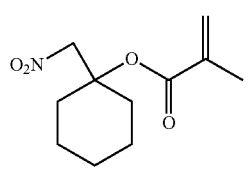 [SMILES: C=C(C)C(=O)OC1(C[N+](=O)[O-])CCCCC1]

1-(nitromethyl)cyclohexyl methacrylate

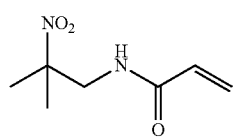

N-(2-methyl-2-nitropropyl)acrylamide

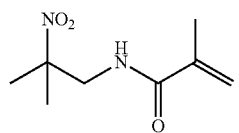

N-(2-methyl-2-nitropropyl)methacrylamide

TABLE 1-continued

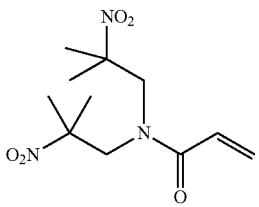 [SMILES: C=CC(=O)N(CC(C)(C)[N+](=O)[O-])CC(C)(C)[N+](=O)[O-]]

N,N-bis(2-methyl-2-nitropropyl)acrylamide

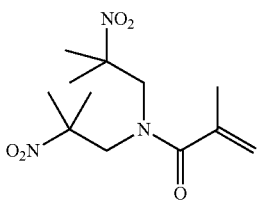 [SMILES: C=C(C)C(=O)N(CC(C)(C)[N+](=O)[O-])CC(C)(C)[N+](=O)[O-]]

N,N-bis(2-methyl-2-nitropropyl)methacrylamide

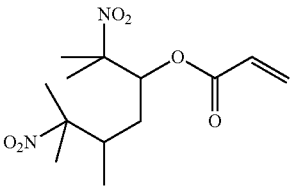 [SMILES: C=CC(=O)OC(CC(C)C(C)(C)[N+](=O)[O-])C(C)(C)[N+](=O)[O-]]

2,5,6-trimethyl-2,6-dinitroheptan-3-yl acrylate

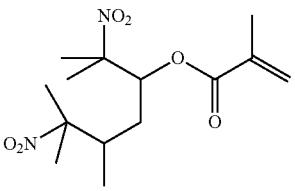 [SMILES: C=C(C)C(=O)OC(CC(C)C(C)(C)[N+](=O)[O-])C(C)(C)[N+](=O)[O-]]

2,5,6-trimethyl-2,6-dinitroheptan-3-yl methacrylate

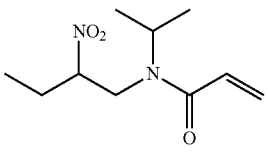

N-isopropyl-N-(2-nitrobutyl)acrylamide

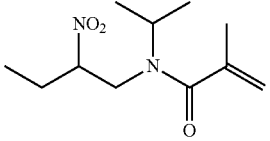 [SMILES: C=C(C)C(=O)N(CC(CC)[N+](=O)[O-])C(C)C]

N-isopropyl-N-(2-nitrobutyl)methacrylamide

The following compounds are believed to be novel: 2-methyl-2-nitropropane-1,3-diyl bis(2-methylacrylate); 3-hydroxy-2-methyl-2-nitropropyl acrylate; 3-hydroxy-2-methyl-2-nitropropyl methacrylate; 2-ethyl-2-nitropropane-1,3-diyl bis(2-methylacrylate); 2-(hydroxymethyl)-2-nitrobutyl acrylate; 2-(hydroxymethyl)-2-nitrobutyl methacrylate; 3-hydroxy-2-(hydroxymethyl)-2-nitropropyl methacrylate; 2-(hydroxymethyl)-2-nitropropane-1,3-diyl diacrylate; 2-(hydroxymethyl)-2-nitropropane-1,3-diyl bis (2-methylacrylate); 3-nitrooctan-4-yl acrylate; 3-nitrooctan-4-yl methacrylate; 2-((methacryloyloxy)methyl)-2-nitropropane-1,3-diyl bis(2-methylacrylate); 2-methyl-2-nitrobutyl acrylate; 2-methyl-2-nitrobutyl methacrylate; (1-nitrocyclohexyl)methyl acrylate; (1-nitrocyclohexyl)methyl methacrylate; 1-(nitromethyl)cyclohexyl acrylate; 1-(nitromethyl)cyclohexyl methacrylate; N-(2-methyl-2-nitropropyl) methacrylamide; N,N-bis(2-methyl-2-nitropropyl) acrylamide; N,N-bis(2-methyl-2-nitropropyl) methacrylamide; 2,5,6-trimethyl-2,6-dinitroheptan-3-yl acrylate; 2,5,6-trimethyl-2,6-dinitroheptan-3-yl methacrylate; N-isopropyl-N-(2-nitrobutyl)acrylamide; and N-isopropyl-N-(2-nitrobutyl)methacrylamide.

Monomer units of formula I may be readily prepared by forming the appropriate nitroalcohol or nitroamine via a standard Henry or Mannich reaction respectively, followed by capping the resultant —OH or —NH groups with an acrylate or methacrylate moieties.

Henry reactions are typically performed by mixing a nitroalkane and a base catalyst (typically a tertiary alkyl amine) in an inert solvent (typically water or lower alcohols) and adding the aldehyde to the resultant mixture at temperatures from 25-100° C. Mannich reactions are typically performed by mixing a nitroalkane and an aldehyde together in an inert solvent (typically water or lower alcohols), and slowly adding the amine to the resultant mixture at temperatures between 25 and 100° C. The resultant products may be isolated using standard techniques, such as distillation or crystallization.

There are a variety of methods that can be used to cap either the —OH or —NH moieties with a (meth)acrylate unit. Common methods include reaction of the alcohol with acryloyl chloride or acrylic anhydride.

According to the invention, the monomer unit of formula I as described above is copolymerized with a one or more other comonomers to form a copolymer. Suitable comonomers for the copolymerization are esters or amides of acrylic acid or methacrylic acid, or their mixtures. Thus, the comonomer may be, for instance, acrylic acid, methacrylic acid, esters thereof (acrylates and methacrylates), including the methyl-, butyl-, ethyl-, and 2-ethylhexyl esters of acrylic acid or methacrylic acid, acrylamide, methacrylamide, or other derivatives thereof (e.g., phosphoethyl methacrylate, acetoacetoxyethyl methacrylate), or mixtures of two or more thereof. Additional comonomers may also be included in the copolymer including, but not limited to, styrene.

In some embodiments, the amount of monomer unit of formula I in the copolymer is at least 0.5% by weight, with the balance being the other comonomers in the polymer, including the acrylic and methacrylic compounds and derivatives and styrene, if present. In some embodiments, the amount of the monomer unit of formula I in the copolymer is no more than 80%, alternatively no more than 50%.

An aqueous emulsion of the copolymer may typically be prepared by emulsion polymerization. The emulsion polymerization can be carried out by methods well known in the polymer art, and includes multiple stage polymerization processes. Various synthesis adjuvants such as initiators, chain transfer agents, and surfactants are optionally utilized in the polymerization. In general, the reaction vessel is charged with water, and optionally surfactants and other polymerization adjuvants and optionally a polymer seed, then a part of the monomers for the polymer matrix is added to the kettle, and finally the remainder of the monomer for the polymer matrix is added to the kettle. The polymerization may be run as a shot process, or by using multiple shots, or by continuously feeding in the monomer over time. The monomer may be added neat or emulsified in water with appropriate surfactants.

The copolymer as described above is useful as binder for an aqueous based paint or coating or for other applications, such as adhesive, sealant, primer, caulk, or filler formulations.

A paint or coating may be used to provide a protective and/or decorative barrier for a variety of surfaces, including metal, wood, plastic, brick, wallboard, etc. For instance, it may be used for bridges, floors, transportation vehicles, metal and non-metal parts, exteriors and interiors of houses, and other buildings. The amount of the binder in paint or coating formulation of the invention can be the amount conventionally used, which can vary widely due to the protection requirements, gloss/sheen range, and also the solids concentration, of a specific paint formulation. By way of non-limiting example, the amount of binder solids may be from about 2% to about 90%, alternatively from about 5% to about 80%, alternatively from about 10% to about 65%, or alternatively from about 20% to about 55%, of the total formulation weight.

A typical paint or coating according to the invention may comprise, in addition to the binder composition, a carrier. A pigment may also be included where a pigmented paint or coating is desired. The formulation may contain other additives commonly used in paints and coatings including, but not limited to, additional binders, a neutralizing agent, leveling agents and surfactants and wetting agents, a thickener, a rheology modifier, co-solvents such as glycols, including propylene glycol or ethylene glycol, a corrosion inhibitor, a defoamer, a co-dispersant, a biocide, a coalescing agent, and/or a colorant.

The carrier in the paint or coating formulation is present in order to dissolve, disperse, and/or suspend the other formulation ingredients In the aqueous based formulations of the invention, the carrier is usually water, although other water-based solutions such as water-alcohol mixtures and the like may be used. The aqueous carrier generally makes up the balance of the formulation, after all the other ingredients have been accounted for.

Neutralizers may be included in aqueous based paints or coatings in order to neutralize residual acid moieties or to raise the pH to a desired value, sometimes between about 8 and 10. Suitable neutralizers are well known in the industry and include, without limitation, ammonia, 2-amino-2-methyl-1-propanol (AMP), dimethylethanolamine (DMEA), potassium hydroxide, sodium hydroxide, monoethanolamine, monoisopropanolamine, lithium carbonate, sodium carbonate, potassium carbonate, butyldiethanolamine, or diethylaminoethanol.

Pigments may be included to provide hiding power and a desired color to the final coated material and may also be used to provide bulk to the paint or coating. While multiple pigments may be present in end-use paints or coatings, sometimes only white pigment, such as titanium oxide, perhaps in combination with extender pigments such as calcium carbonate and/or kaolin clay, is added in the early stages of the formation of the formulation. Any other desired pigments of various colors (including more white pigment) can optionally be added at the later stages of, or after, the formulation is completed.

Pigments may be organic or inorganic. Examples of pigments can include, but are not limited to, titanium dioxide, kaolin clay, calcined kaolin clay, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, quinacridone magenta, quinacridone violet, and the like, and any combination thereof.

The paint and coating formulations of the invention may be manufactured by conventional paint manufacturing techniques, which are well known to those skilled in the art. Typically, the formulations are manufactured by a two-step process. First, a dispersion phase, commonly referred to as the grind phase, is prepared by mixing the dry pigments (if present) with other grind phase components, including most other solid powder formulation materials, under constant high shear agitation to provide a high viscosity and high solids mixture. This part of the process is designed to effectively wet and disperse the dry materials and stabilize them in an aqueous dispersion.

The second step of the paint manufacturing process is commonly referred to as the letdown or thindown phase, because the viscous grind is diluted with the remaining formulation components, which are generally less viscous than the grind mix. Typically, the binders, any predispersed pigments, and any other paint materials that only require mixing and perhaps moderate shear, are incorporated during the letdown phase. The letdown phase may be done either by sequentially adding the letdown components into a vessel containing the grind mix, or by adding the grind mix into a vessel containing a premix of the latex resins and other letdown components, followed by sequential addition of the final letdown components. In either case, constant agitation is needed, although application of high shear is not required.

The nitrofunctional acrylate based binders of the invention have been found to impart desirable properties, including desirable hardness and/or chemical resistance. The formulations may also result in improved gloss. In some embodiments, coatings that comprise acrylate based binders of the invention, when applied to a substrate, exhibit Konig or pendulum hardness as measured according to ASTM D4366 of at least 10 seconds, alternatively at least 16 seconds, or alternatively at least 20 seconds, following 1 day of coating drying. In some embodiments, coatings that comprise acrylate based binders of the invention, when applied to a substrate, exhibit Konig or pendulum hardness of at least 20 seconds, alternatively at least 32 seconds, or alternatively at least 38 seconds, following 7 days of coating drying.

Some embodiments of the invention will now be described in detail in the following Examples.

EXAMPLES

General. Nitrofunctional acrylate monomers may be prepared by a variety of techniques, for instance using the method described in Takahashi et al., *J. Appl. Polym. Sci.* 1968, 12, 1683-1695. In a typical preparation, a nitroalcohol compound and an equimolar or slight excess of acryloyl chloride or methacryloyl chloride are mixed in a suitable solvent. The mixture is stirred at elevated temperature until sufficient reaction has occurred, typically 12 to 24 hours. Following reaction, unreacted materials may be removed by distillation and the product washed with water and dried over anhydrous sodium sulfate. Purification of the product may be carried out using known techniques, such as distillation under reduced pressure. The desired structure may be confirmed using FTIR, 13C and 1H NMR, or GC/MS.

Example 1

Preparation of 2-Nitro-2-Methylpropyl Methacrylate (NMPMA)

The title compound may be prepared through substantially the same procedure as described above, using 2-nitro-2-methyl-1-propanol and 1 equivalent of acrylic chloride as the starting materials.

Example 2

Preparation of 3-hydroxy-2-methyl-2-nitropropyl acrylate

The title compound may be prepared through substantially the same procedure as described above, using 2-nitro-2-methyl-1,3-propanediol and 1 equivalent of acryloyl chloride as the starting materials.

Example 3

Preparation of Preparation of 2-methyl-2-nitropropane-1,3-diyl diacrylate

The title compound may be prepared through substantially the same procedure as described above, using 2-nitro-2-methyl-1,3-propanediol and 2 equivalents of acryloyl chloride as the starting materials.

Example 4

Preparation of 3-hydroxy-2-(hydroxymethyl)-2-nitropropyl methacrylate

The title compound may be prepared through substantially the same procedure as described above, using tris(hydroxymethyl)nitromethane and 1 equivalent of methacryloyl chloride as the starting materials.

Example 5

Preparation of 1-(nitromethyl)cyclohexyl methacrylate

The title compound may be prepared through substantially the same procedure as described above, using 1-nitromethyl-cyclohexanol and 1 equivalent of methacryloyl chloride as the starting materials.

Example 6

Preparation of N,N-bis(2-methyl-2-nitropropyl)acrylamide

A 100 mL round bottom flask is charged with N,N-bis(2-methyl-2-nitropropyl)amine (0.01 mol, 1 eq.), diethyl ether (50 mL) and triethylamine (1.1 g, 1.1 eq). The clear colorless solution is cooled to 5° C. using an ice bath. To the stirred solution under nitrogen, acryloyl chloride (0.9 g, 1 eq) dissolved in 5 mL diethyl ether is added dropwise over a period of 30 minutes. After stirring for an additional 2 hours, the mixture is filtered to remove the precipitated triethylamine-hydrochloride, the clear, colorless organic solution is washed with dilute hydrochloric acid (5% aqueous, 50 mL), saturated aqueous sodium bicarbonate (50 mL) and water (50 mL). After drying over magnesium sulfate and filtration, the solvent is removed on a rotary evaporator resulting in a light tan solid product. GC analyses indicates 95% purity. The desired structure is confirmed using FTIR, C and HNMR, and GC/MS.

Example 7

Preparation of 2,5,6-trimethyl-2,6-dinitroheptan-3-ylmethacrylate

The title compound may be prepared through substantially the same procedure as described above, using 2,5,6-trimethyl-2,6-dinitroheptan-3-ol and 1 equivalent of methacryloyl chloride as the starting materials.

Example 8

Preparation of N-isopropyl-N-(2-nitrobutyl)methacrylamide

The title compound may be prepared through substantially the same procedure as described in Example 6, using N-isopropyl-N-(2-nitrobutyl)amine and 1 equivalent of methacryloyl chloride as the starting materials.

Example 9

Synthesis of Acrylic 1 (Inventive Copolymer)

A polymer having the composition 9.8 STY (styrene)/29.9 EHA (2-ethylhexyl acrylate)/47.2 MMA (methyl methacrylate)/5 AAEM (acetoacetoxyethyl methacrylate)/5 NMPMA (2-nitro-2-methylpropyl methacrylate)/3.2 PEM (phosphoethyl methacrylate) is prepared as follows:

A monomer emulsion is prepared using 220.3 g deionized (DI) water, 17.6 g (30.4% active) anionic surfactant, 90.5 g STY, 276 g EHA, 433.7 g MMA, 45.5 g AAEM, 45.5 g NMPMA, and 29.0 g PEM. A three-liter, 4-neck round bottom flask containing an initial charge of 588.7 g DI water and a solution of 17.1 g of anionic surfactant (30.4% active) in 16.1 g DI water, followed by a rinse of 5 g DI water, is heated to 87° C. under nitrogen sweep. An aliquot of monomer emulsion (29.6 g) is added to the flask along with a rinse of 10 g DI water, which is followed by the addition of a solution of 3.2 g APS (ammonium persulfate)) in 20 g DI water and a rinse of 5 g DI water. After stirring for 5 min, the remaining monomer emulsion and a solution of 1.4 g APS in 36.7 g DI water are added separately to the flask over 120 min. The contents of the reaction flask are maintained at 86° C. during the addition of the monomer emulsion. When all the additions are complete the monomer emulsion container is rinsed with 44 g DI water and the APS container is rinsed with 5 g of water, which are added to the reaction flask. The reaction flask is cooled to 70° C. and a t-butyl hydroperoxide/isoascorbic acid redox pair is added. The polymer is neutralized with aqueous ammonia (28%). The solid content is 45.0%.

Example 10

Synthesis of Acrylic 2 (Control (Comparative) Copolymer)

A polymer having the composition 9.8 STY/29.9 EHA/52.2 MMA/5 AAEM/3.2 PEM is prepared as follows:

A monomer emulsion is prepared using 474 g DI water, 38.5 g (30.4% active) anionic surfactant, 195 g STY, 594 g EHA, 1000 g MMA, 97.5 g AAEM, and 62.4 g PEM. A five-liter, 4-neck round bottom flask containing an initial charge of 1360 g DI water and a solution of 37.4 g of anionic surfactant (30.4% active) in 32 g DI water, followed by a rinse of 26 g DI water, is heated to 87° C. under nitrogen sweep. An aliquot of monomer emulsion (63.7 g) is added to the flask along with a rinse of 42 g DI water, which is followed by the addition of a solution of 6.8 g APS in 42 g DI water and a rinse of 10 g DI water. After stirring for 5 min, the remaining monomer emulsion and a solution of 2.9 g APS in 79 g DI water are added separately to the flask over 120 min. The contents of the reaction flask are maintained at 86° C. during the addition of the monomer emulsion. When all the additions are complete the monomer emulsion container is rinsed with 42 g DI water and the APS container is rinsed with 5 g of water, which are added to the reaction flask. The reaction flask is cooled to 70° C. and a t-butyl hydroperoxide/isoascorbic acid redox pair is added. The polymer is neutralized with aqueous ammonia (28%). The solid content is 45.0%.

Example 11

Clear Coating Formulations and Testing

Testing Techniques. Coating gloss is determined in accordance with ASTM-D523 using a Byk-Gardner micro-tri-gloss gloss meter. Konig or pendulum hardness is measured according to ASTM D4366 using a TQC SP0500 Pendulum Hardness Tester after 1 and 7 days of coating drying, and is reported in seconds. Pencil hardness is determined in accordance with ASTM Test method D3363-05 after 1 and 7 days of coating drying. The pencil is held firmly against the film at a 45° angle (pointed away from the operator) and pushed away from the operator in a 6.5-mm (¼-in.) stroke. The process is started with the hardest pencil and continued down the scale of hardness to the pencil that will not cut into or gouge the film. The hardness of this last pencil used is rated as the pencil hardness of the coatings, as from soft to hard, 6B-5B-4B-3B-2B-B-HB-F-H-2H-3H-4H-5H-6H-7H-8H.

A coating formulation as shown in Table 2 is prepared.

TABLE 2

| Raw Material | Function | wt % |
|---|---|---|
| Acrylic Polymer | Binder or Polymer | 76.73 |
| Water | Carrier | 10.95 |
| Rhoplex WP-1[1] | Plasticizer | 3.00 |
| Dowanol DPnB[2] | Coalescing Agent | 3.81 |
| Tego Foamex 1488[3] | Defoamer | 0.06 |
| Tego Glide 410[4] | Glide, anti-crater and anti-scratch additive | 0.25 |
| Dowanol DPM[5] | Solvent | 0.25 |
| Michelman ME-39235[6] | Antiblocking Scratch/Scrub/Mar resistance agent | 4.75 |
| Byk 346[7] | Wetting Agent | 0.01 |
| Acrysol RM-825[8] | Rheology Modifier | 0.19 |
| Totals | | 100.00 |

[1]A plasticizer from The Dow Chemical Company;
[2]A coalescent agent from Dow;
[3]A defoamer by Evonik Industries;
[4]A glide and anti-crater additive with scratch resistance by Evonik Industries;
[5]A solvent from Dow;
[6]An antiblocking and Scratch/Scrub/Mar resistance agent by Michelman;
[7]A wetting agent by BYK Chemie; and
[8]A Rheology Modifier from Dow.

Testing on Treated Aluminum

Coatings are applied to a treated aluminum panel (Q panel Type A1-412 from Q-Lab Corporation chromate pretreated aluminum) using a drawdown bar with a 10 mil gap to yield dry films of approximately 2 mil thickness. The panels are air cured and the gloss, Konig hardness and pendulum hardness are measured. Results are shown in Table 3.

TABLE 3

| Binder | Acrylic 1 (inventive) | Acrylic 2 (comparative) |
|---|---|---|
| Gloss - treated Al | | |
| 20° | 93.3 | 75.6 |
| 60° | 116.0 | 111.0 |
| Konig Hardness (seconds) | | |
| 1 day | 20.2 | 15.9 |
| 7 day | 38.6 | 31.9 |
| Pencil Hardness | | |
| 1 day | 3B | 5B |
| 7 day | 3B | 3B |

Chemical Testing on Maple

For chemical testing on maple boards, the coatings are sprayed at a thickness of 4 wet mil, allowed to dry, sanded with 180 grit sandpaper then sprayed with a topcoat of the same material at 4 wet mil. The chemical resistance is tested after allowing the coatings to cure at room temperature for 7 days. Testing is performed by putting a 23 mm diameter Whatman filter paper on the board and saturating it with the chemical. The chemical puddles are then covered with caps to prevent/limit evaporation during the test. After the appropriate time (1 hour or 16 hour) the chemical and filter paper are washed off and the board is dried. All samples are graded 1-10 where 10 indicates no visible sign or softening of the coating and 1 indicates complete removal/dissolution of the film.

TABLE 4

| Binder | Acrylic 1 (inventive) | Acrylic 2 (comparative) |
|---|---|---|
| 1 hour | | |
| Ethanol | 8 | 6 |
| IPA | 1 | 1 |
| Butyl Acetate | 1 | 1 |
| Acetone | 8 | 1 |
| 16 hour | | |
| Water | 7 | 5 |
| Hot coffee | 10 | 10 |
| 50% Ethanol | 9 | 7 |
| 409 Cleaner | 8 | 8 |
| IPA | 5 | 3 |
| 7% Ammonia | 10 | 10 |
| Red Ink | 9 | 10 |
| Lemon juice | 10 | 10 |
| Grape juice | 10 | 10 |
| Mustard | 7 | 7 |

SUMMARY

An acrylic polymer containing 5% of the nitro monomer NMPMA shows improvement over a control polymer in several areas: gloss, Konig hardness, Pencil hardness (including early hardness), and chemical/solvent resistance.

What is claimed is:

1. A binder composition comprising:
   (a) a copolymer formed from one or more esters or amides of acrylic acid or methacrylic acid, or their mixtures, together with a monomer unit of formula I:

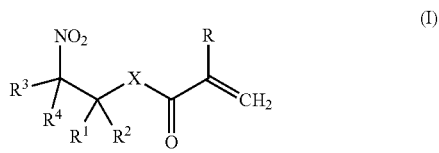

wherein R is H or $CH_3$;
   each $R^1$ and $R^2$ are independently H, linear or branched $C_1$-$C_8$ alkyl optionally substituted with $NO_2$, or $R^1$ and $R^2$, together with the carbon atom to which they are attached, form $C_3$-$C_{12}$ cycloalkyl;
   $R^3$ is H, linear or branched $C_1$-$C_8$ alkyl, or a group of formula $C(R^1)(R^2)$—O—$R^5$, wherein $R^5$ is H or $C(=O)$—$C(R)=CH_2$,
   $R^4$ is a linear or branched $C_4$-$C_8$ alkyl or a group of formula $C(R^1)(R^2)$—O—$R^5$, or
   $R^3$ and $R^4$, together with the carbon atom to which they are attached, form $C_3$-$C_{12}$ cycloalkyl;
   X is O; and
   (b) water,
   wherein the binder composition is an aqueous emulsion.

2. The binder composition of claim 1 wherein $R^1$ is H and $R^2$ is H or linear or branched $C_1$-$C_8$ alkyl optionally substituted with $NO_2$.

3. The binder composition of claim 1 wherein $R^1$ and $R^2$ are independently linear or branched $C_1$-$C_8$ alkyl optionally substituted with $NO_2$, or $R^1$ and $R^2$, together with the carbon atom to which they are attached, form $C_3$-$C_{12}$ cycloalkyl.

4. The binder composition of claim 1 wherein $R^3$ is H and $R^4$ is a linear or branched $C_4$-$C_8$ alkyl or a group of formula $C(R^1)(R^2)$—O—$R^5$.

5. The binder composition of claim 1 wherein $R^3$ and $R^4$ is a linear or branched $C_1$-$C_8$ alkyl and $R^4$ is a linear or branched $C_4$-$C_8$ alkyl; or $R^3$ and $R^4$, together with the carbon atom to which they are attached, form $C_3$-$C_{12}$ cycloalkyl.

6. The binder composition of claim 1 wherein $R^3$ and $R^4$ are independently a group of formula $C(R^1)(R^2)$—O—$R^5$.

7. The binder composition of claim 1 wherein the monomer unit of formula I comprises: 2-methyl-2-nitropropane-1,3-diyl diacrylate; 2-methyl-2nitropropane-1,3-diyl bis(2-methylacrylate); 3-hydroxy-2-methyl-2-nitropropyl acrylate; 3-hydroxy-2-methyl-2-nitropropyl methacrylate; 2-ethyl-2-nitropropane-1,3-diyl diacrylate; 2-ethyl-2-nitropropane-1,3-diyl bis(2-methylacrylate); 2-(hydroxymethyl)-2-nitrobutyl acrylate; 2-(hydroxymethyl)-2-nitrobutyl methacrylate; 3-hydroxy-2-(hydroxymethyl)-2-nitropropyl acrylate; 3-hydroxy-2-(hydroxymethyl)-2-nitropropyl methacrylate; 2-(hydroxymethyl)-2-nitropropane-1,3-diyl diacrylate; 2-(hydroxymethyl)-2-nitropropane-1,3diyl bis(2-methylacrylate); 2-((acryloyloxy)methyl)-2-nitropropane-1,3-diyl diacrylate; 2-((methacryloyloxy)methyl)-2nitropropane-1,3-diyl bis(2-methylacrylate); (1-nitrocyclohexyl)methyl acrylate; (1-nitrocyclohexyl) methyl methacrylate; 1-(nitromethyl)cyclohexyl acrylate; or 1-(nitromethyl)cyclohexyl methacrylate.

8. The binder composition of claim 1 for use in an aqueous based paint or coating, an adhesive, sealant, a primer, a caulk, or a filler.

9. An aqueous based paint or coating composition comprising:
(a) a grind phase; and
(b) a letdown phase including a binder, wherein the binder is a composition according to claim 1.

10. The binder composition of claim 1 wherein $R^1$ and $R^2$ are independently linear or branched $C_1$-$C_6$ alkyl optionally substituted with $NO_2$.

11. The binder composition of claim 1 wherein both $R^1$ and $R^2$ are H.

12. The binder composition of claim 1 wherein $R^1$ and $R^2$, together with the carbon atom to which they are attached, form a cyclopentyl, cyclohexyl, cycloheptyl, or cyclooctyl.

13. The binder composition of claim 1 wherein the one or more esters or amides of acrylic acid or methacrylic acid comprise methyl, butyl, ethyl, and 2-ethylhexyl esters of acrylic acid or methacrylic acid; phosphoethyl methacrylate; acetoacetoxyethyl methacrylate; or mixtures of two or more thereof.

14. The binder composition of claim 1 wherein the copolymer further comprises styrene.

15. The aqueous based paint or coating composition of claim 9 wherein the amount of binder solids is about 2% to about 90% of the total formulation weight.

16. The aqueous based paint or coating composition of claim 9 wherein the composition when applied to a substrate and dried for one day has a pendulum hardness of at least 10 seconds or when dried for seven days has a pendulum hardness of at least 20 seconds.

17. The aqueous based paint or coating composition of claim 9 wherein the composition has a pH of about 8-10.

18. A binder composition comprising:
(a) a copolymer formed from one or more esters or amides of acrylic acid or methacrylic acid, or their mixtures, together with a monomer unit of formula I:

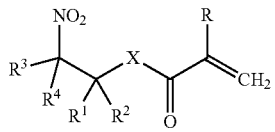

(I)

wherein R is H or $CH_3$;
each $R^1$ and $R^2$ are independently H, linear or branched $C_1$-$C_8$ alkyl optionally substituted with $NO_2$, or $R^1$ and $R^2$, together with the carbon atom to which they are attached, form $C_3$-$C_{12}$ cycloalkyl;

$R^3$ and $R^4$ are independently H, linear or branched $C_1$-$C_8$ alkyl, or a group of formula $C(R^1)(R^2)$—O—$R^5$, wherein $R^5$ is H or $C(=O)$—$C(R)=CH_2$, or
$R^3$ and $R^4$, together with the carbon atom to which they are attached, form $C_3$-$C_{12}$ cycloalkyl;
X is $NR^6$, wherein $R^6$ is H, linear or branched $C_1$-$C_8$ alkyl optionally substituted with $NO_2$, or $R^6$ is $C(=O)$—$C(R)=CH_2$; and
(b) water,
wherein the binder composition is an aqueous emulsion.

19. The binder composition of claim 18 wherein the monomer unit of formula I comprises: N-(2-methyl-2-nitropropyl)acrylamide; N-(2-methyl-2-nitropropyl)methacrylamide; N,N-bis(2-methyl-2-nitropropyl)acrylamide; N,N-bis(2-methyl-2-nitropropyl)methacrylamide; N-isopropyl-N-(2-nitrobutyl)acrylamide; or N-isopropyl-N-(2-nitrobutyl)methacrylamide.

20. A binder composition comprising:
(a) a copolymer formed from one or more esters or amides of acrylic acid or methacrylic acid, or their mixtures, together with a monomer unit of formula I:

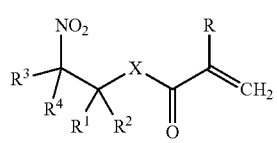

(I)

wherein R is H or $CH_3$;
each $R^1$ is H, linear or branched $C_1$-$C_8$ alkyl optionally substituted with $NO_2$,
each $R^2$ is a linear or branched $C_1$-$C_8$ alkyl substituted with $NO_2$;
$R^3$ is H, linear or branched $C_1$-$C_8$ alkyl, or a group of formula $C(R^1)(R^2)$—O—$R^5$, wherein $R^5$ is H or $C(=O)$—$C(R)=CH_2$,
$R^4$ is a linear or branched $C_1$-$C_8$ alkyl or a group of formula $C(R^1)(R^2)$—O—$R^5$, or
$R^3$ and $R^4$, together with the carbon atom to which they are attached, form $C_3$-$C_{12}$ cycloalkyl;
X is O; and
(b) water,
wherein the binder composition is an aqueous emulsion.

21. The binder composition of claim 20 wherein the monomer unit of formula I comprises: 2,5,6-trimethyl-2,6-dinitroheptan-3-yl acrylate or 2,5,6-trimethyl-2,6-dinitroheptan-3-yl methacrylate.

* * * * *